United States Patent [19]
Takagi et al.

[11] Patent Number: 5,560,787
[45] Date of Patent: Oct. 1, 1996

[54] ROLLING BEARING FOR HIGH-SPEED ROTATION AT HIGH TEMPERATURES

[75] Inventors: Masaaki Takagi, Aichi; Manabu Ohori, Kanagawa; Kyozaburo Furumura, Kanagawa; Kenji Yamamura, Kanagawa, all of Japan

[73] Assignee: NSK Ltd., Tokyo, Japan

[21] Appl. No.: 507,748

[22] Filed: Jul. 26, 1995

Related U.S. Application Data

[63] Continuation of Ser. No. 267,654, Jun. 29, 1994, abandoned.

[30] Foreign Application Priority Data

Jun. 29, 1993 [JP] Japan ..................................... 5-159674

[51] Int. Cl.$^6$ ................................. C23C 8/32; C23C 8/22
[52] U.S. Cl. ................................. 148/319; 148/906
[58] Field of Search ..................... 148/319, 906, 148/232, 233

[56] References Cited

U.S. PATENT DOCUMENTS 4,191,599  3/1980  Stickels et al. ..................... 148/906

FOREIGN PATENT DOCUMENTS 63-62847  3/1988  Japan.
1-201422  8/1989  Japan.

*Primary Examiner*—Deborah Yee
*Attorney, Agent, or Firm*—Sughrue, Mion, Zinn, Macpeak & Seas

[57] ABSTRACT

One of component parts of an inner race, an outer race and rolling elements of a rolling bearing is composed of a bearing material that is prepared by working a high-speed steel, carburizing or carbonitriding the wrought steel in a temperature range from 800° C. to less than 1200° C. and subsequently hardening and tempering the carburized or carbonitrided steel, the steel composing of 0.2 wt %≦C≦2.3 wt %, Si≦1.0 wt %, Mn≦1.0 wt %, 2.0 wt %≦Cr≦7.0 wt %, 1.5 wt %≦W≦22.0 wt %, Mo≦10.0 wt %, 0.5≦V≦6.0 wt %, Co≦18.0 wt %, the balance Fe and incidental impurities. By carburizing or carbonitriding the steel at low temperatures less than 1,200° C., not only high core toughness is insured but also the dissolved C or N in the surface is compensated to increase the hot strength of the steel and the compressive stress that remains in the surface after heat treatment, so that the rolling bearing that rotate at high speed and high temperatures of more 400° C. extends the service life.

13 Claims, 3 Drawing Sheets

1

ROLLING BEARING FOR HIGH-SPEED ROTATION AT HIGH TEMPERATURES

This is a Continuation of application Ser. No. 08/267,654 filed Jun. 29, 1994, now abandoned.

BACKGROUND OF THE INVENTION

The present invention relates to steels for rolling members that are suitable for use as bearings in high-speed rotation at high temperatures as in aircraft jet engines and gas turbines. The present invention also relates to rolling bearings that provide an outer race, an inner race and rolling elements, particularly relating to those rolling bearings which are extended in their service life.

From energy and environmental viewpoints, efforts are recently being made to increase the operating efficiency of aircraft jet engines, gas turbines and other rotating machines and, as a result, the conditions under which bearings are used have become more rigorous than ever, namely, the rotational speed has increased and the field of rotation has become hotter. Conventionally, semi-high-speed steel AISIM50 has been used as a bearing material for high-speed rotation at high temperatures. This steel is intended for use at 200° C. and as long as it is used at this temperature, it is capable of effectively insuring $H_RC$ (Rockwell Hardness in scale C) 60 which is the necessary hardness for bearings; however, it fails to assure the necessary hardness at higher temperatures. Bearings in aircraft jet engines, gas turbines and other rotating machines are predicted for use at temperatures of 300° to 400° C. in the near future; however, in this temperature range, AISIM50 is only capable of assuring hardness in the range form $H_RC$ 55 to $H_RC$ 59 and its life would come to an end very soon. It should also be noted that in the field of high-speed rotation at high temperatures, the precision of bearings per se must be improved and the slightest error leads to a serious accident. An accident to jet engines is fatal to human life whereas an accident to power generation turbines can be a serious social problem; in either case, greater care must be exercised to secure safety than when operating other rotating machines. Therefore, the slightest dents, cracks or other surface flaws in bearings should not directly lead to the entire failure of the bearings. In other words, the core of rolling component parts such as the inner race, outer race and rolling elements of a rolling bearing have desirably not only high toughness but also a sufficient compressive stress in the neighborhood of their surface to withstand the high hoop stress that develops upon high-speed rotation. However, AISIM50 has low toughness since macro carbides are interspersed in the basis structure; in addition, a compressive stress region which develops upon final surface working such as grinding and polishing remains in the surface of AISIM50 but it occurs in a very shallow area.

Under the circumstances, efforts are being made to produce a powder sintered version of AISIM50 by a process that provides preparing a compact of powder feed and performing HIP (hot isostatic pressing) to increase the density of the sinter. The powder sintered steel thus produced is improved in the toughness of the core but the problems of insufficient hot hardness and very shallow surface compressive stress region remain practically unsolved. According to Unexamined Japanese Patent Publication (kokai) Hei 1-201422, it is proposed that in order to refine the carbides in AISIM50, hot homogenization should be performed by first working the steel to a forging ratio of at least 2 and then soaking it at 1150° to 1220° C. for a period of at least 2 hours. However, the problems of insufficient hot hardness and very shallow surface compressive stress region also remain unsolved. Unexamined Japanese Patent Publication (kokai) Sho 63-62847 proposes extending the life of AISIM50 under clean environments by restricting the content of inclusions; however, the hot hardness of the steel is not improved and little is expected in the extension of its life under hot environments by this approach. In addition, the problems of low core toughness and very shallow surface compressive stress region remain unsolved. In recent years, M50NiL which is reduced in the carbon content compared to AISIM50 and which has Ni added to achieve a structural balance has been proposed and is finding increased use; with this new steel, the problems of low core toughness and shallow surface compressive stress region are solved but the problem of insufficient hot hardness is not.

Thus, no steels have yet been developed that have high core toughness, adequately deep surface residual stress region and higher hot hardness and which are capable of withstanding the operation of rotating machines under rigorous conditions that are to be encountered in the future as the rotational speed increases at higher temperatures.

Accordingly, the conventional steels have the following problems. The steel AISIM50 which has conventionally been used as a bearing material for high-speed rotation at high temperatures has poor toughness since macro carbides are present in the basis structure and, considering the future use of bearings at higher temperatures, the hot hardness of AISIM50 is insufficient. Further, it does not have a sufficient residual compressive stress in the neighborhood of the surface to withstand the hoop stress that develops during high-speed rotation at high temperatures.

SUMMARY OF THE INVENTION

An object of the present invention is to provide a rolling bearing using a bearing material for high-speed rotation at high temperatures that has higher hot hardness than AISIM50 to insure at least $H_RC$ 60 (the value necessary to extend the life of bearings even if they are used in the range of 300° to 400° C. at which bearings are expected to be used in the near future), that has high core toughness at least twice the value for AISIM50 and that has a high surface compressive stress region in a surface layer.

To attain the above-stated object, the rolling bearing for high-speed rotation at high temperatures is characterized in that at least one of component parts of the inner race, the outer race and the rolling elements is composed of a bearing material that is prepared by working a high-speed steel, carburizing or carbonitriding the wrought steel in a temperature range from 800° C. to less than 1200° C. and subsequently hardening and tempering the carburized or carbonitrided steel, the steel composing of 0.2 wt %≦C≦2.3 wt %, Si≦1.0 wt %, Mn≦1.0 wt %, 2.0 wt %≦Cr≦7.0 wt %, 1.5 wt %≦W≦22.0 wt %. Mo≦10.0 wt %. 0.5 wt %≦V≦6.0 wt %, Co≦18.0 wt %, the balance Fe and incidental impurities.

DETAILED DESCRIPTION OF THE PREFERRED EMBODIMENTS

Figure 1:
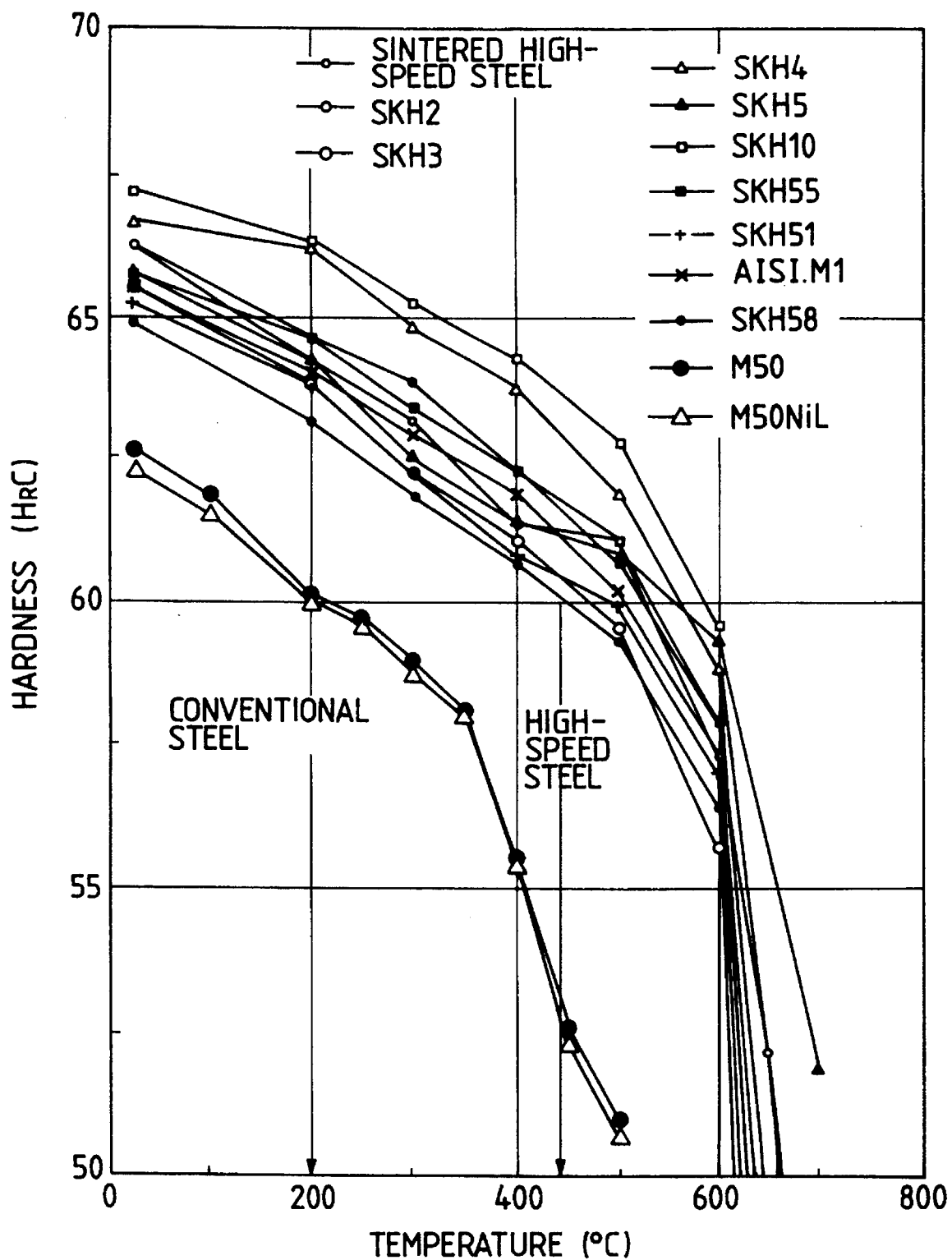
FIG. 1 is a graph showing the hot strength data of two conventional steels (AISIM50 and M50NiL) and various high-speed steels.

The present inventors started their study by selecting the desired high-speed steel to meet the condition that it is a reliable material that can insure the necessary hardness of at least $H_RC$ (Rockwell Hardness in scale C) 60 for bearings even if they are used in the range of 300° to 400° C. at which bearings are expected to be used in the near future. By using limited components as shown in FIG. 1, the high-speed steel can insure a hot hardness value as high as $H_RC$ 60 at 400° C., which has been unattainable by AISIM50 and M50NiL, two conventional bearing steels for high-speed rotation at high temperatures.

The criticality for the limitation on the structural components of the high-speed steel and powder sintered high-speed steel of the present invention, as well as on the carburizing or carbonitriding temperature for making those steels is described below.

Carbon Content: 0.2 wt %≦C≦2.3 wt %

Carbon is an element that increases the strength of steel by forming carbides and transforming the matrix to a martensite phase. In the present invention, the greater part of C and N which are interstitial solid-solution forming elements for reinforcing a portion of the surface layer, in particular, martensite is furnished by carburization or carbonitriding. To assure satisfactory strength in the core, at least 0.2 wt % of carbon must be present. If carbon is incorporated in excess of 2.3 wt %, the amount of carbides is so much increased as to cause lower toughness.

Silicon Content: Si≦1.0 wt %

Silicon is necessary as a deoxidizer but if it is contained in an excessive amount, the carburizability and forgeability of the steel are impaired and its toughness is lowered. Therefore, the silicon content should not exceed 1.0 wt %.

Manganese Content: Mn≦1.0 wt %

Manganese is also necessary as a deoxidizer and it improves the hardening performance of the steel. However, if it is added in an excessive amount, the toughness of the steel is lowered. therefore, the manganese content should not exceed 1.0 wt %.

Chromium Content: 2.0 wt %≦Cr≦7.0 wt %

Chromium forms carbides to provide improved wear resistance. The greater part of Cr dissolves in the matrix to provide increased hardening performance. Chromium is not highly effective if it is present in an amount of less than 2.0 wt %; on the other hand, if its content exceeds 7.0 wt %, its effectiveness is saturated and there is not commensurate increase in the effect that is achieved by the addition of Cr. Furthermore, the presence of excessive Cr lowers the resistance to seizure. Hence, the upper limit of Cr addition is set at 7.0 wt %.

Tungsten Content: 1.5 wt %≦W≦22.0 wt %

Tungsten forms hard carbides and part of it dissolves in the matrix to provide increased resistance to temper softening, thereby increasing the hot hardness and improving the wear resistance of the steel. The effectiveness of tungsten is limited if its content is less than 1.5 wt %; on the other hand, if tungsten is added in excess of 22.0 wt %, its effectiveness is saturated and there is no commensurate increase in the effect that is achieved by the addition of W.

Molybdenum: Mo≦10.0 wt %

Molybdenum behaves in a similar way to tungsten and 1 wt % of Mo is comparable to 2 wt % of W in achieving a marked increase in the resistance to temper softening. However, if Mo is contained excessively, not only are decarburization and Mo depletion prone to occur but also the toughness and wear resistance of the steel decreases. Therefore, the content of molybdenum is specified to be not more than 10.0 wt %.

Vanadium Content: 0.5 wt %≦V≦6.0 wt %

Vanadium increases the resistance to temper softening; it also forms carbides of high hardness to increase the hot hardness of the steel. The effectiveness of V is limited if its content is less than 0.5 wt %. On the other hand, excessive addition of V increases the difficulty in cutting operations. Therefore, the content of vanadium should not exceed 6.0 wt %.

Cobalt Content: Co≦18.0 wt %

Cobalt dissolves in the matrix and increases the amount of C in solid solution, thereby enhancing the hot strength of the steel. However, if Co is contained in an excessive amount, the toughness of the steel decreases. Therefore, the content of cobalt should not exceed 18.0 wt %.

Temperature for Carburization and Carbonitriding

Figure 2:
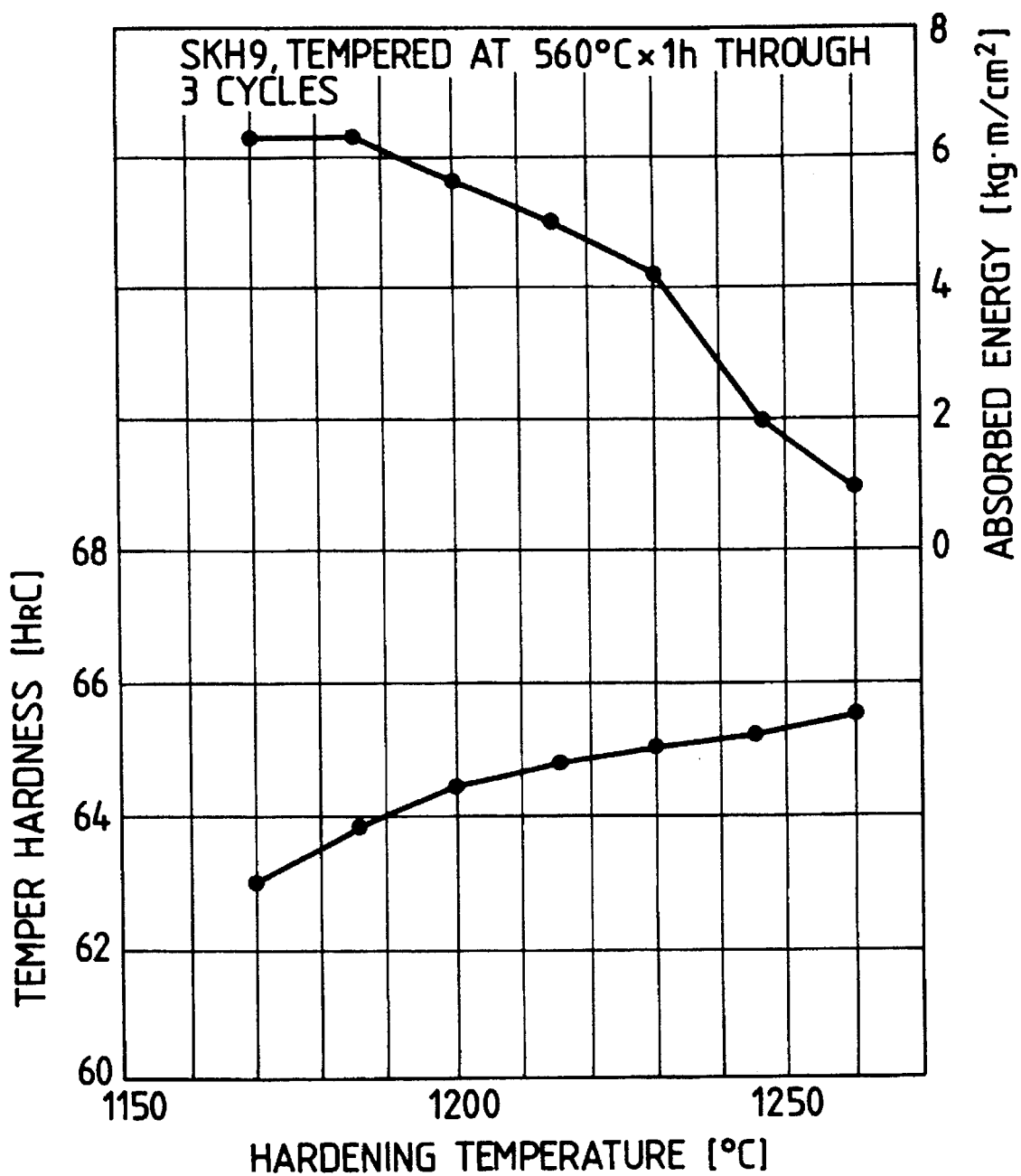
FIG. 2 is a graph showing the effects of hardening temperature on the toughness and temper hardness of a high-speed steel (SKH9)

The high-speed steel to be treated for use as the bearing material in the present invention is a steel species exhibiting high hot strength that has been developed by making use of the following fact: upon hardening, carbides dissolve in the matrix which, hence, is brought to ordinary temperatures as it keeps elements such as C, Cr, W, Mo and V dissolved in large amounts and, in subsequent tempering at 500° to 600° C., these elements crystallize as very fine alloy carbide to cause a "secondary hardening" phenomenon. Hence, elements such as C, Cr, W, Mo and V are added in large amounts in the high-speed steel under consideration and the alloy carbides that have been formed of these elements are stable and do not dissolve readily in the matrix. Therefore, the high-speed steel is hardened at a very high temperature of 1200° to 1350° C. that is slightly below the point where a molten phase occurs. However, if hardening is done at such high temperatures, the hardness of the steel increases (see FIG. 2) but, on the other hand, it deteriorates in toughness primarily due to the coarsening of austenitic crystal grains. Therefore, if toughness is important, hardening must be done at temperatures less than 1200° C. but then the amount of dissolved C is insufficient to prevent the drop in hot hardness. Therefore, in the present invention, dissolved C is furnished by carburization or carbonitriding. The temperature for carburization and carbonitriding is specified to be less than 1200° C. in order to assure the toughness of the core of the bearing. Below 800° C., the rate of carburization and carbonitriding is so slow that the production cost increases inevitably; this is why the lower limit of the temperature for carburization and carbonitriding is set at 800° C. It should be mentioned here that the rate of carburization can be enhanced by performing plasma-assisted carburization. Since dissolved C or N is furnished by carburization or carbonitriding, the difference between the content of dissolved C or N in the core and in the surface increases. Accordingly, the residual compressive stress in the surface increases after heat treatment. In addition, the residual compressive stress region in the surface is much deeper than in AISIM50. Therefore, the steel treated in accordance with the present invention has an increased resistance to the high hoop stress that develops during high-speed rotation at high temperatures.

If carbides dissolve in small amounts on account of the low hardening temperature and if the resulting metal elements in solid solution are insufficient to cause satisfactory "secondary hardening", one may reduce the relative proportion of C to the contents of Cr, Mo, W, V, etc. within the compositional ranges specified herein. If powder sintering is effected, the carbides are refined, leading to a further improvement in toughness.

Further, according to the present invention, the high-speed steel to be treated as the bearing material is first subjected to working mechanically into predetermined shapes for practically producing rolling component parts such as an inner race, outer race and rolling elements of the rolling bearing. Then, the shaped steel is subjected to the carburization or carbonitriding treatment, and subsequently the hardening and tempering treatments.

Average Residual Compressive Stress in the Neighborhood of the Surface: 225 to 400 MPa In order to resist the high hoop stress of 3,000,000 DN required in the near future, if the toughness obtained by the invention steel is considered, the residual compressive stress is necessary to be not less than 225 MPa over the range from the surface to a depth of 2 mm. However, if the residual compressive stress is too high, heat treatment deformation is occurred. Therefore, the residual compressive stress should not exceed 400 MPa.

Surface Hardness: $H_RC$ 60 to 65 (300° to 400° C.)

In order to improve the wear resistance and to resist the shearing stress at high temperatures, if it is considered to use the rolling bearing in high-speed rotation at high temperatures, the hardness in the neighborhood of the surface is necessary to be not less than $H_RC$ 60 at expected temperature 300° to 400° C. However, if the hardness is too high, impact resistance is lowered. Therefore, the surface hardness should not exceed $H_RC$ 65.

Izod Impact Value: 100 to 200 J

If it is considered to use the rolling bearing under rigorous conditions such as higher speed rotation and higher temperatures than the conventional use conditions, the toughness of the core where it is not carburized or carbonitrided is necessary to be more twice than AISIM50. Therefore, the toughness is necessary to be not less than 100 J. However, since the toughness of the invention steel is limited to 200 J in practical use, the toughness should not exceed 200 J.

Examples

The samples of high-speed steel and powder sintered high-speed steel that are identified in Table 1, as well as two comparative samples, AISIM50 and M50NiL, were subjected to carburization and other heat treatments under the conditions shown in Table 2. Also shown in Table 2 are the following characteristics of the steels thus treated: i) hardness at 400° C. of a sample in a layer of 0.15 mm deep from the surface; ii) the toughness of an area neither carburized nor carbonitrided as equivalent to the toughness of the core of bearing (measured in an Izod impact test); and iii) the average residual stress in the neighborhood of the surface which was the average of nine measurements of the residual stress by the X-ray method at intervals of 0.25 mm over the range from the surface to a depth of 2 mm (in which minus values mean the compressive stress).

Comparative steels X (AISIM50) and Y (M50NiL) had average residual stresses of –82 MPa and –218 MPa, respectively, in the neighborhood of the surface. In contrast, the corresponding values for the invention steels lied between –225 MPa and –393 MPa, indicating that the invention steels had greater residual compressive stresses than the comparative steels. One can also see that the invention steels required shorter carburization times than M50NiL to produce greater average residual stresses in the neighborhood of the surface.

Figure 3:
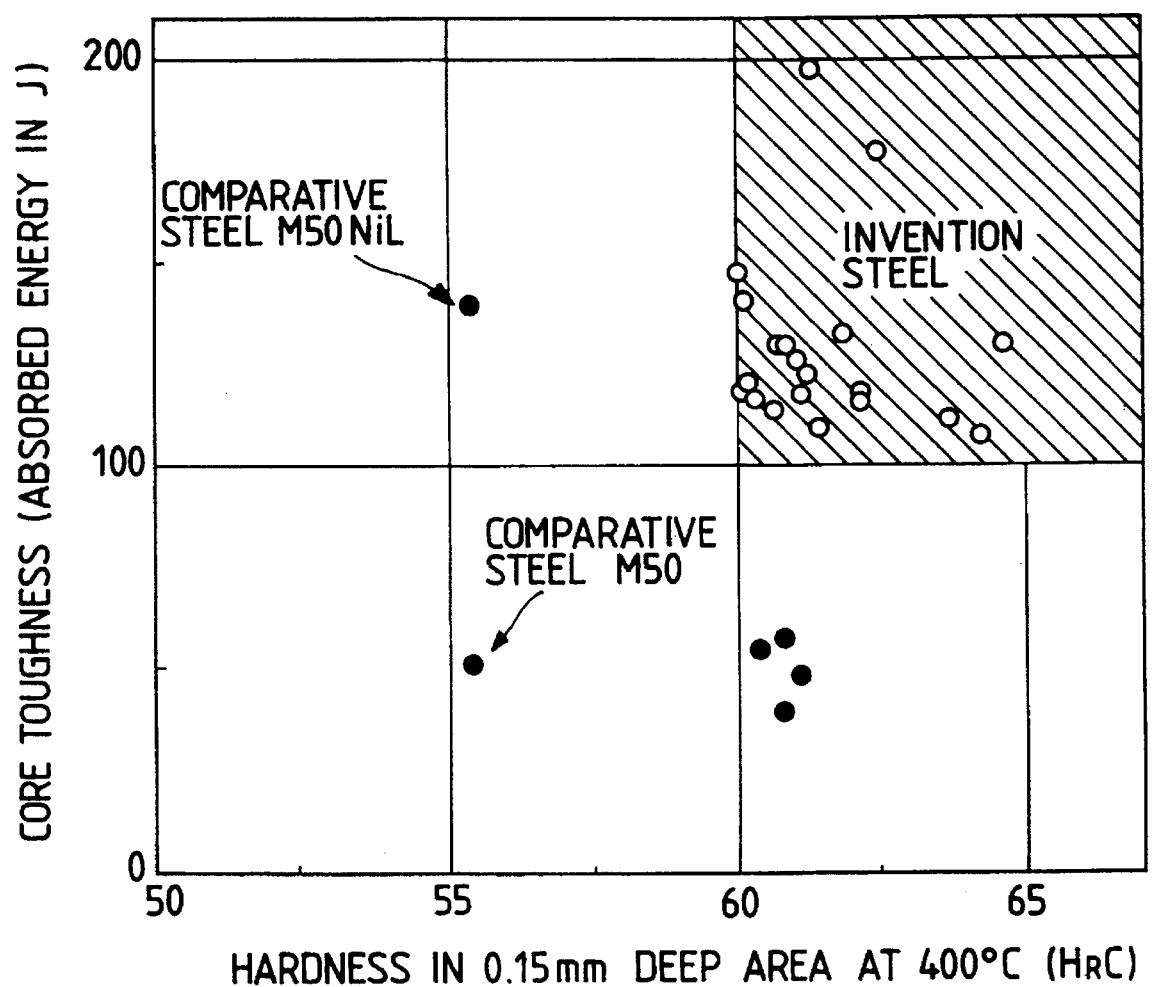
FIG. 3 is a diagram showing the core toughness and the hardness at 400° C. in a 0.15-mm deep area for the invention steels and two comparative steels.

The data on the toughness of the core of bearing given in Table 2 are shown graphically in FIG. 3 together with the hardness at 400° C. in a layer of 0.15 mm deep area from the sample's surface. Comparative steels X (AISIM50) and Y (M50NiL) showed hardness values of only about $H_RC$ 55 but, on the other hand, all of the invention steels maintained the necessary hardness level $H_RC$ 60 even at 400° C. One can also see that invention steels exhibited at least twice as much toughness in the bearing's core as comparative steel X (AISIM50) while being comparable to comparative steel Y (M50NiL).

TABLE 1

| | Steel species | Designation | Chemical composition (wt %) | | | | | | | | |
|---|---|---|---|---|---|---|---|---|---|---|---|
| | | | C | Si | Mn | Cr | Mo | W | V | Co | Ni |
| Example | high-speed steel (SKH2) | A | 0.76 | 0.28 | 0.31 | 4.11 | — | 18.10 | 1.15 | — | — |
| | high-speed steel (SKH3) | B | 0.78 | 0.25 | 0.32 | 4.15 | — | 18.02 | 1.11 | 4.78 | — |
| | high-speed steel (SKH4) | C | 0.76 | 0.31 | 0.31 | 4.17 | — | 19.13 | 1.42 | 10.26 | — |
| | high-speed steel (SKH5) | D | 0.28 | 0.27 | 0.26 | 4.05 | — | 18.27 | 1.22 | 16.88 | — |
| | high-speed steel (SKH10) | E | 1.52 | 0.28 | 0.33 | 4.12 | — | 11.98 | 5.10 | 4.96 | — |
| | high-speed steel (SKH55) | F | 0.81 | 0.23 | 0.28 | 4.18 | 5.48 | 6.21 | 2.15 | 5.02 | — |
| | high-speed steel (SKH51) | G | 0.81 | 0.25 | 0.32 | 4.12 | 5.45 | 6.26 | 4.19 | — | — |
| | high-speed steel (AISIM1) | H | 0.77 | 0.23 | 0.32 | 4.13 | 8.78 | 2.78 | 1.24 | 0.81 | — |
| | high-speed steel (SKH58) | I | 0.99 | 0.29 | 0.33 | 4.09 | 8.82 | 1.97 | 2.25 | — | — |
| | powder sintered high-speed steel | J | 0.30 | 0.34 | 0.32 | 4.25 | 5.03 | 6.43 | 2.69 | — | — |
| | powder sintered high-speed steel | K | 0.50 | 0.32 | 0.32 | 4.25 | 5.11 | 6.40 | 2.64 | — | — |
| | powder sintered high-speed steel | L | 1.30 | 0.32 | 0.31 | 4.20 | 5.05 | 6.40 | 2.66 | — | — |
| | powder sintered high-speed steel | M | 1.29 | 0.31 | 0.32 | 4.24 | 5.07 | 6.45 | 2.75 | 8.10 | — |
| | powder sintered high-speed steel | N | 1.93 | 0.30 | 0.31 | 4.26 | 4.61 | 14.08 | 4.97 | 10.07 | — |
| Comparative Example | semi-high-speed steel AISIM50 | X | 0.82 | 0.21 | 0.28 | 4.12 | 4.31 | — | 1.03 | — | — |
| | M50NiL | Y | 0.14 | 0.22 | 0.30 | 4.07 | 4.28 | — | 1.21 | — | 3.51 |

TABLE 2

| Section | Steel species | Carburization or carbonitriding temp. (°C.) × time (h) | Carburization or carbonitriding treatment | Hardening temp. (°C.) | Temper temp (°C.) × time (h) × no. of cycles | Hardness at 400° C. (0.15 mm deep) H$_R$C | Core toughness Izod impact test J | Core toughness ratio to comparative steel X | Average residual stress in the neighborhood of the surface MPa |
|---|---|---|---|---|---|---|---|---|---|
| Invention steel | A | 1150 × 1 | carburization & hardening | — | 560 × 1 × 3 | 61.0 | 126 | 2.4 | −320 |
| | B | 1150 × 1 | carburization & hardening | — | 560 × 1 × 3 | 62.2 | 116 | 2.2 | −318 |
| | C | 1150 × 1 | carburization & hardening | — | 560 × 1 × 3 | 63.7 | 112 | 2.2 | −304 |
| | D | 1150 × 1 | carburization & hardening | — | 560 × 1 × 3 | 61.4 | 110 | 2.1 | −355 |
| | E | 1150 × 1 | plasma carburization & hardening | — | 560 × 1 × 3 | 64.2 | 108 | 2.1 | −368 |
| | F | 1150 × 1 | carburization & hardening | — | 560 × 1 × 3 | 62.2 | 119 | 2.3 | −306 |
| | G | 1150 × 1 | carburization hardening & sub-zero treatment | — | 560 × 1 × 3 | 60.8 | 130 | 2.5 | −393 |
| | G | 1150 × 1 | carburization & hardening | — | 560 × 1 × 3 | 60.5 | 125 | 2.4 | −362 |
| | G | 1100 × 1 | carburization & hardening | — | 560 × 1 × 3 | 60.1 | 141 | 2.7 | −298 |
| | G | 1050 × 1 | carburization & hardening | — | 560 × 1 × 3 | 60.0 | 148 | 2.8 | −261 |
| | G | 930 × 8 | carburization | 1150 | 560 × 1 × 3 | 60.7 | 130 | 2.5 | −307 |
| | H | 1150 × 1 | carburization & hardening | — | 560 × 1 × 3 | 61.8 | 133 | 2.6 | −325 |
| | I | 1150 × 1 | carburization & hardening | — | 560 × 1 × 3 | 60.6 | 114 | 2.2 | −340 |
| | J | 1150 × 1 | carburization & hardening | — | 560 × 1 × 3 | 61.2 | 123 | 2.4 | −304 |
| | J | 930 × 8 | plasma carburization | 1100 | 560 × 1 × 3 | 60.2 | 121 | 2.3 | −265 |
| | K | 1150 × 1 | carburization & hardening | — | 560 × 1 × 3 | 61.1 | 118 | 2.3 | −328 |
| | K | 840 × 8 | carburization & hardening | — | 560 × 1 × 3 | 60.0 | 119 | 2.3 | −225 |
| | L | 1150 × 1 | carburization & hardening | 1050 | 560 × 1 × 3 | 61.3 | 199 | 3.8 | −296 |
| | M | 1150 × 1 | carburization & hardening | — | 560 × 1 × 3 | 62.5 | 178 | 3.4 | −282 |
| | N | 1150 × 1 | carburization & hardening | — | 560 × 1 × 3 | 64.6 | 130 | 2.5 | −304 |
| Comparative steel | A | — | — | 1280 | 560 × 1 × 3 | 60.8 | 40 | 0.8 | +65 |
| | G | — | — | 1260 | 560 × 1 × 3 | 61.1 | 49 | 0.9 | +73 |
| | A | 1250 × 0.5 | carburization & hardening | — | 550 × 1 × 3 | 60.4 | 55 | 1.1 | −390 |
| | G | 1250 × 0.5 | carburization & hardening | — | 560 × 1 × 3 | 60.8 | 58 | 1.1 | −387 |
| | G | 700 × 8 | carburization & hardening | — | 560 × 1 × 3 | 23.1 | 132 | 2.5 | −12 |
| | X | — | — | 1120 | 550 × 1.5 × 3 | 55.5 | 52 | 1.0 | −82 |
| | Y | 900 × 9 | carburization | 1120 | 560 × 1 × 3 | 55.4 | 140 | 2.7 | −218 |

As described above, the rolling bearing of the present invention uses a bearing material that has a sufficiently high hot strength of H$_R$C 60 or more at 400° C. to be capable of withstanding use at 400° C. (i.e., the expected temperature for the near future) and which also has high core toughness and large residual compressive stress in the neighborhood of the surface. Hence, the rolling bearing can perform satisfactorily for a prolonged period even if it is rotated at high speed and high temperatures and, in addition, it becomes more accident-proof.

Further, the description of the examples is directed to the rolling bearing in which the concept of the present invention is applied to at least one of component parts, i.e., the outer race, the inner race and the rolling elements. In the present invention, the member that rolls relative to the rolling elements is not at all limited to either the outer or inner race of the bearing. The present invention can be applied to other members of the component parts that roll relative to the rolling elements, such as the housing, shaft, nuts and screws.

What is claimed is:

1. A rolling bearing for high-speed rotation at high temperatures, comprising component parts of an inner race, an outer race and rolling elements, wherein at least one of said component parts is prepared by working a high-speed steel comprising: 0.2 wt %≦C≦2.3 wt %; Si≦1.0 wt %; Mn≦1.0 wt %; 2.0 wt %≦Cr≦7.0 wt %; 1.5 wt %≦W≦22.0 wt %; Mo≦10.0 wt %; 0.5 wt %≦V≦6.0 wt %; Co≦18.0 wt %; the balance Fe and incidental impurities, wherein a surface layer of at least one of said component parts has hardness of the range from 60 to 65 in Rockwell hardness at the temperature of the range from 300° to 400° C.

2. A rolling bearing for high-speed rotation at high temperatures, comprising component parts of an inner race, an outer race and rolling elements, wherein at least one of said component parts is prepared by working a high-speed steel comprising: 0.2 wt %≦C≦2.3 wt %; Si≦1.0 wt %; Mn≦1.0 wt %; 2.0 wt %≦Cr≦7.0 wt %; 1.5 wt %≦W≦22.0 wt %; Mo≦10.0 wt %; 0.5 wt %≦V≦6.0 wt %; Co≦18.0 wt %; the balance Fe and incidental impurities, wherein average residual compressive stress in the neighborhood of a surface of at least one of said component parts is 225 to 400 MPa in the range from the surface to a depth of 2 mm.

3. A rolling bearing for high-speed rotation at high temperatures, comprising component parts of an inner race, an outer race and rolling elements, wherein at least one of said component parts is prepared by working a high-speed steel comprising: 0.2 wt %≦C≦2.3 wt %; Si≦1.0 wt %; Mn≦1.0 wt %; 2.0 wt %≦Cr≦7.0 wt %; 1.5 wt %≦W≦22.0 wt %; Mo≦10.0 wt %; 0.5 wt %≦V≦6.0 wt %; Co≦18.0 wt %; the balance Fe and incidental impurities, wherein an Izod impact value of a core of at least one of said component parts is 100 to 200 J.

4. The rolling bearing of claim 1, wherein average residual compressive stress in the neighborhood of a surface of at least one of said component parts is 225 to 400 MPa in the range from the surface to a depth of 2 mm.

5. The rolling bearing of claim 1, wherein an Izod impact value of a core of at least one of said component parts is 100 to 200 J.

6. The rolling bearing of claim 4, wherein an Izod impact value of a core of at least one of said component parts is 100 to 200 J.

7. The rolling bearing of claim 2, wherein an Izod impact value of a core of at least one of said component parts is 100 to 200 J.

8. The rolling bearing of claim 1, wherein the steel is subjected to a carburizing and hardening treatment, or a carbonitriding and hardening treatment, at a temperature range from 1050°–1200° C., and then tempering at a temperature range of 500°–600° C.

9. The rolling bearing of claim 2, wherein the steel is subjected to a carburizing and hardening treatment, or a carbonitriding and hardening treatment, at a temperature range from 1050°–1200° C., and then tempering at a temperature range of 500°–600° C.

10. The rolling bearing of claim 3, wherein the steel is subjected to a carburizing and hardening treatment, or a carbonitriding and hardening treatment, at a temperature range from 1050°–1200° C., and then tempering at a temperature range of 500°–600° C.

11. The rolling bearing of claim 1, wherein the steel is subjected to carburizing at a temperature of 930° C. for 8 hours, and then tempering at a temperature range of 500°–600° C.

12. The rolling bearing of claim 2, wherein the steel is subjected to carburizing at a temperature of 930° C. for 8 hours, and then tempering at a temperature range of 500°–600° C.

13. The rolling bearing of claim 3, wherein the steel is subjected to carburizing at a temperature of 930° C. for 8 hours, and then tempering at a temperature range of 500°–600° C.

* * * * *